Patented Apr. 9, 1940

2,196,776

UNITED STATES PATENT OFFICE 2,196,776

AZO DYE COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application November 19, 1938, Serial No. 241,459

12 Claims. (Cl. 260—155)

This invention relates to the art of dyeing or coloring. More particularly, it relates to new aromatic azo dye compounds and the application of the nuclear non-sulfonated dye compounds for the coloration of organic derivatives of cellulose, particularly textile materials made of or containing an organic derivative of cellulose, by dyeing, printing, stenciling, or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of our invention to provide a new class of aromatic azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The azo dye compounds of our invention have the general formulae:

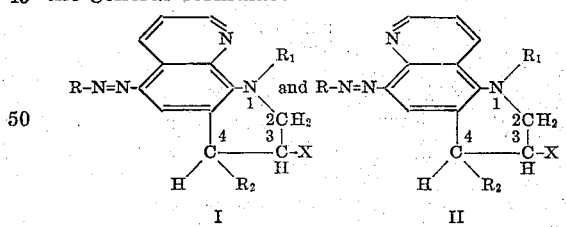

I II wherein R represents the residue of an aromatic nucleus, $R_1$ represents hydrogen, an alkyl group, an allyl group, a cycloalkyl group, a benzyl radical, an aryl group or a heterocyclic group, $R_2$ represents an alkyl group and X represents hydrogen, a hydroxyl group, an oxygen alkylketo group, such as

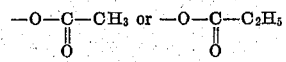

an acid ester of phosphorus group such as

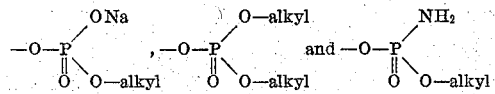

an oxygen alkyl group, an —O—SO$_3$Na—, —O—SO$_3$—NH$_4$ or —O—SO$_3$NH$_2$ group.

It will be understood that alkyl as used herein, unless otherwise stated, includes not only unsubstituted alkyl groups such as a methyl group, an ethyl group or a propyl group but also substituted alkyl groups such as β-hydroxyethyl, β,γ-hydroxypropyl, β-methoxyethyl or β-ethoxyethyl, for example. Illustrative of cycloalkyl may be mentioned cyclohexyl.

The azo dye compounds of our invention can be prepared by diazotizing a primary aromatic amine and coupling the diazonium compound obtained with a coupling compound having the general formulae:

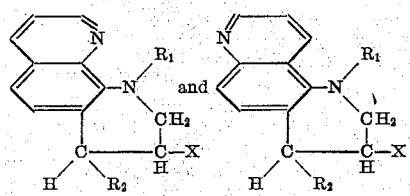

wherein $R_1$, $R_2$ and X have the meaning previously assigned to them. These formulae represent derivatives of tetrahydro-1,10-phenanthroline and tetrahydro-1,7-phenanthroline, respectively.

As previously indicated, the nuclear non-sulfonated aromatic azo dye compounds of our invention constitute valuable dyes for the coloration of organic derivatives of cellulose such as those hereinbefore mentioned, yielding various shades thereon of good fastness to light and washing. These nuclear non-sulfonated dye compounds likewise possess application for the dyeing of wool and silk and yield generally similar shades on these materials as on organic derivatives of cellulose. Compounds in which the aromatic nucleus designated R contains a nuclear sulfonic acid group can likewise be prepared in known fashion. These compounds possess little or no utility for the coloration of organic derivatives of cellulose but can be employed to color textile materials such as wool and silk, yielding various shades thereon. For the dyeing of organic derivatives of cellulose such as cellulose acetate silk, nuclear non-sulfonated compounds wherein R is a phenyl residue are generally advantageous. Said phenyl residue may be substituted as clearly shown herein.

The following examples illustrate the preparation of the azo dye compounds of our invention:

*Example 1*

One gram mole of o-chloroaniline is diazotized and coupled with one gram mole of

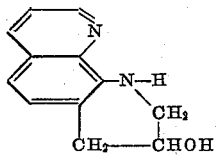

dissolved in cold dilute hydrochloric acid. Coupling is completed by adding sodium acetate until the mixture is neutral to Congo red paper. When coupling is complete, the dye is filtered, washed and dried. The dye colors cellulose acetate yellow from an aqueous suspension of the dye.

*Example 2*

One gram mole of p-aminoacetophenone is diazotized and coupled with one gram mole of

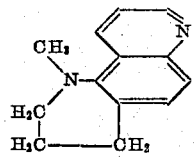

as in Example 1. Cellulose acetate is colored orange from an aqueous suspension of the dye.

*Example 3*

One gram mole of methyl anthranilate is diazotized and coupled as in Example 1 with one gram mole of

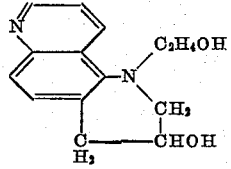

Cellulose acetate is colored yellow from an aqueous suspension of the dye.

*Example 4*

One gram mole of p-nitroaniline is diazotized and coupled with one gram mole of

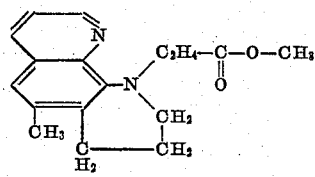

as in Example 1. Cellulose acetate is colored red from an aqueous suspension of the dye.

*Example 5*

One gram mole of p-nitro-o-chloroaniline is diazotized and coupled with one gram mole of

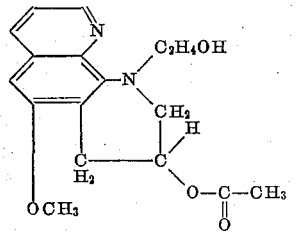

as in Example 1. Cellulose acetate is colored rubine shades from an aqueous suspension of the dye.

*Example 6*

One gram mole of p-nitro-o-bromoaniline is diazotized and coupled with one gram mole of

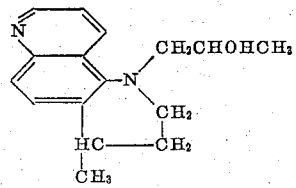

as in Example 1. Cellulose acetate is colored rubine shades from an aqueous suspension of the dye.

*Example 7*

One gram mole of p-nitro-o-iodoaniline is diazotized and added to an iced aqueous solution of

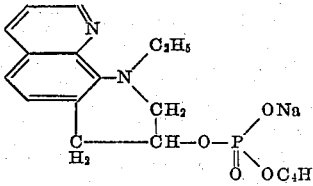

The reaction is completed by adding sodium acetate, the dye salted out, filtered and dried. In a similar manner there are prepared:

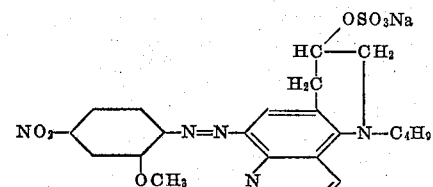

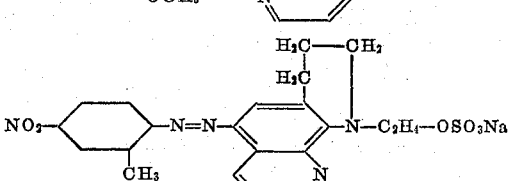

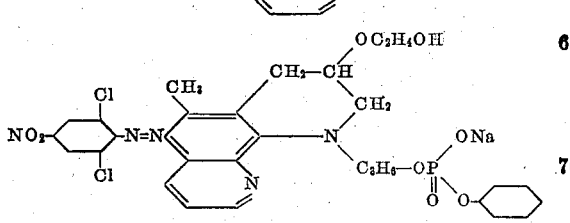

These compounds dye cellulose acetate orange to wine shades from an aqueous solution of the dye which may contain salt.

Example 8

One gram mole of 2,4-dinitroaniline is diazotized and coupled with on gram mole of

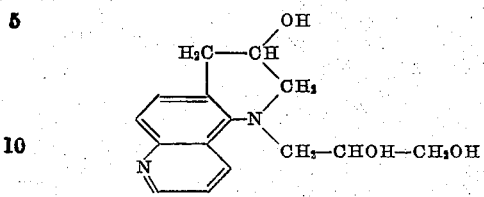

as in Example 1. The dye colors cellulose acetate purple from an aqueous suspension of the dye. Similarly we may prepare:

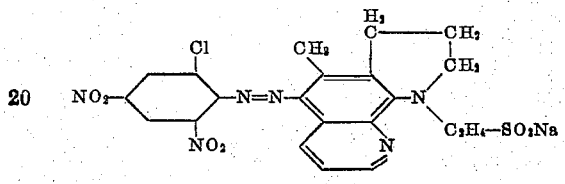
(Red-blue)

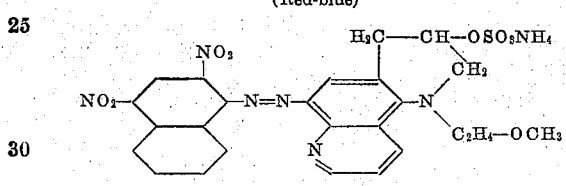
(Blue)

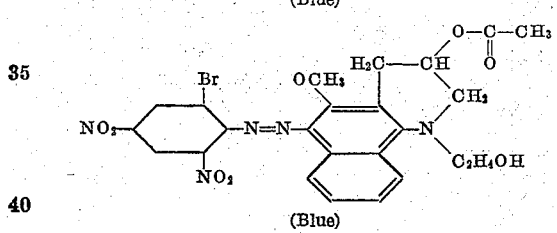
(Blue)

Example 9

One gram mole of 2,4,6-trinitroaniline is diazotized and coupled with one gram mole of

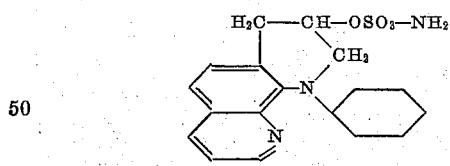

The dye obtained colors cellulose acetate blue from an aqueous suspension of the dye.

Example 10

One gram mole of

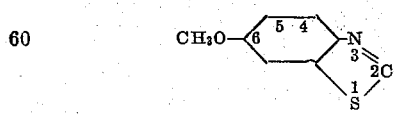

is diazotized and coupled with one gram mole of

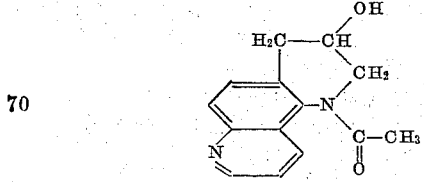

The dye obtained colors cellulose acetate red from an aqueous suspension of the dye.

Example 11

One gram mole of p-amino-azobenzene is diazotized and coupled with one gram mole of

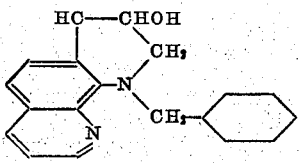

The dye obtained colors cellulose acetate pinkish red from an aqueous suspension of the dye.

Example 12

One gram mole of 5-nitro-2-aminobenzene sulfonic acid is diazotized and coupled with one gram mole of

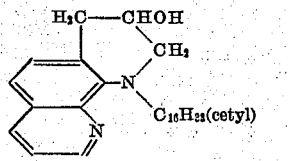

The dye obtained colors wool a wine shade from an aqueous solution of the dye which may contain salt.

In order that the preparation of the azo dye compounds of our invention may be clearly understood, the preparation of the coupling compounds employed in their preparation is briefly indicated hereinafter. Coupling compounds employed in our invention may be obtained by reducing 5-nitroquinoline or 8-nitroquinoline, which compounds have the formula:

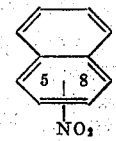

in which the nitro group shown may be in either of the positions numbered 5 and 8 to 5-aminoquinoline or 8-aminoquinoline. This reduction may be carried out by hydrogenation in the presence of a catalyst such as finely divided nickel. The 5-aminoquinoline or 8-aminoquinoline obtained by the above reduction is then treated with a compound such as epichlorohydrin, glycerolchlorohydrin or ClCH₂CH₂CH₂OH to obtain coupling compounds having the general formulae:

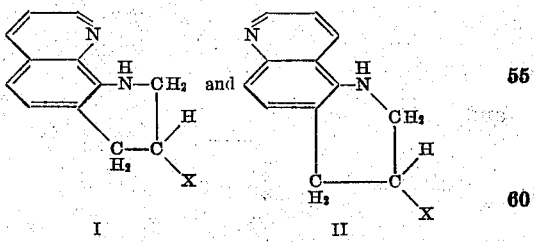

wherein X represents hydrogen or a hydroxy group. The compounds having the formula numbered I and II may then be treated with various alkylating or arylating agents in known fashion to obtain still further coupling components which may be employed in the preparation of the azo compounds of our invention.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The azo dye compounds having the general formula: R—N=N—P wherein R represents the residue of a member selected from the group consisting of an aryl nucleus of the benzene series, an aryl nucleus of the naphthalene series and a benzothiazole nucleus and wherein P represents a phenanthroline compound capable of coupling selected from the group consisting of tetrahydro-1,10-phenanthrolines and tetrahydro-1,7-phenanthrolines.

2. The azo dye compounds having the general formula: R—N=N—P wherein R represents the residue of an aryl nucleus of the benzene series containing but one benzene ring and wherein P represents a phenanthroline compound capable of coupling selected from the group consisting of tetrahydro-1,10-phenanthrolines and tetrahydro-1,7-phenanthrolines.

3. The azo dye compounds selected from the groups consisting of azo compounds having the general formulae:

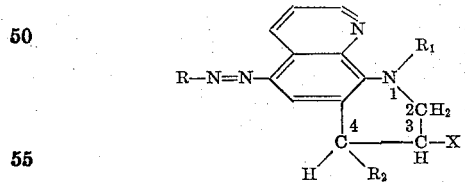

and

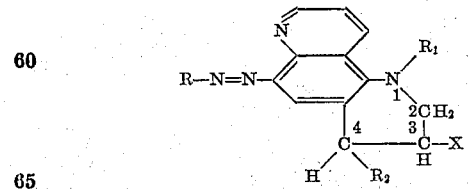

wherein R represents the residue of a member, selected from the group consisting of an aryl nucleus of the benzene series, an aryl nucleus of the naphthalene series and a benzothiazole nucleus, $R_1$ represents a member selected from the group consisting of hydrogen, an alkyl group, an allyl group, a cycloalkyl group, a benzyl radical and a phenyl group, $R_2$ represents an alkyl group and X represents a member selected from the group consisting of hydrogen, a hydroxyl group, an oxygen alkyl keto group, and acid ester of phosphorus group, an alkoxy group and an —O—SO$_3$M group wherein M represents an alkali metal, —NH$_4$, or —NH$_2$.

4. The azo dye compounds selected from the groups consisting of azo compounds having the general formulae:

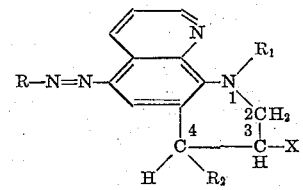

and

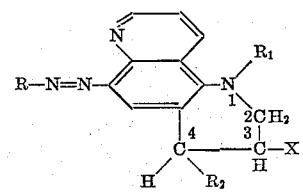

wherein R represents the residue of an aryl nucleus of the benzene series containing but one benzene ring, $R_1$ represents a member selected from the group consisting of hydrogen, an alkyl group, an allyl group, a cycloalkyl group, a benzyl radical and a phenyl group, $R_2$ represents an alkyl group and X represents a member selected from the group consisting of hydrogen, a hydroxyl group, an oxygen alkyl keto group, an acid ester of phosphorus group, an alkoxy group and an —O—SO$_3$M group wherein M represents an alkali metal, —NH$_4$, or —NH$_2$.

5. The azo dye compounds selected from the group consisting of azo compounds having the general formulae:

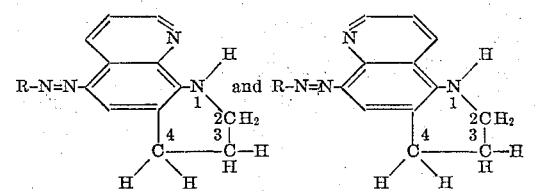

wherein R represents the residue of a member selected from the group consisting of an aryl nucleus of the benzene series, an aryl nucleus of the naphthalene series and a benzothiazole nucleus, wherein the hydrogen atom attached to the nitrogen atom in the position numbered 1 may be substituted by an alkyl group and whereing one of the hydrogens in each of the positions numbered 3 and 4 may be replaced by an alkyl group.

6. The azo dye compounds selected from the group consisting of azo compounds having the general formulae:

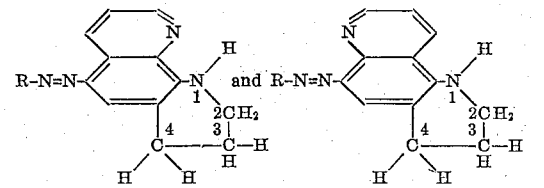

wherein R represents the residue of an aryl nucleus of the benzene series containing but one benzene ring, wherein the hydrogen atom attached to the nitrogen atom in the position numbered 1 may be substituted by an alkyl group and wherein one of the hydrogens in each of the positions numbered 3 and 4 may be replaced by an alkyl group.

7. The azo dye compounds having the general formula:

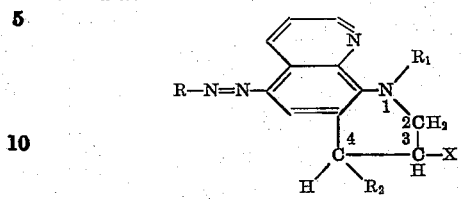

wherein R represents the residue of an aryl nucleus of the benzene series containing but one benzene ring, $R_1$ represents a member selected from the group consisting of hydrogen, an alkyl group, an allyl group, a cycloalkyl group, a benzyl radical and a phenyl group, $R_2$ represents an alkyl group and X represents a member selected from the group consisting of hydrogen, a hydroxyl group, an oxygen alkyl keto group, an acid ester of phosphorus group, an alkoxy group and an —O—$SO_3$M group wherein M represents an alkali metal, —$NH_4$, or —$NH_2$.

8. The azo dye compounds having the general formula:

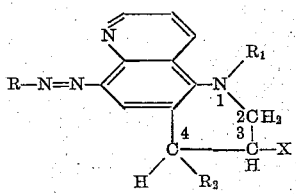

wherein R represents the residue of an aryl nucleus of the benzene series containing but one benzene ring, $R_1$ represents a member selected from the group consisting of hydrogen, an alkyl group, an allyl group, a cycloalkyl group, a benzyl radical and a phenyl group, $R_2$ represents an alkyl group and X represents a member selected from the group consisting of hydrogen, a hydroxyl group, an oxygen alkyl keto group, an acid ester of phosphorus group, an alkoxy group and an —O—$SO_3$M group wherein M represents an alkali metal, —$NH_4$, or —$NH_2$.

9. Material made of or containing an organic derivative of cellulose colored with a nuclear non-sulfonated monoazo dye having the general formula: R—N=N—P wherein R represents the residue of a member selected from the group consisting of an aryl nucleus of the benzene series, an aryl nucleus of the naphthalene series and a benzothiazole nucleus and wherein P represents a phenanthroline compound capable of coupling selected from the group consisting of tetrahydro-1,10-phenanthrolines and tetrahydro-1,7-phenanthrolines.

10. A cellulose acetate colored with a nuclear non-sulfonated monoazo dye having the general formula: R—N=N—P wherein R represents the residue of a member selected from the group consisting of an aryl nucleus of the benzene series, an aryl nucleus of the naphthalene series and a benzothiazole nucleus and wherein P represents a phenanthroline compound capable of coupling selected from the group consisting of tetrahydro-1,10-phenanthrolines and tetrahydro-1,7-phenanthrolines.

11. Material made of or containing an organic derivative of cellulose colored with an azo dye selected from the group consisting of nuclear non-sulfonated monoazo compounds having the general formulae:

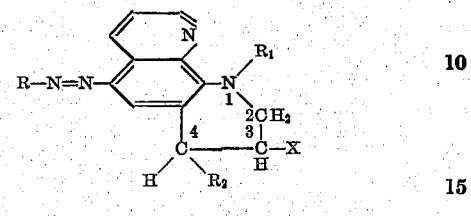

and

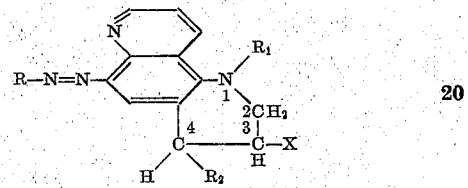

wherein R represents the residue of a member selected from the group consisting of an aryl nucleus of the benzene series, an aryl nucleus of the naphthalene series and a benzothiazole nucleus, $R_1$ represents a member selected from the group consisting of hydrogen, an alkyl group, an allyl group, a cycloalkyl group, a benzyl radical and a phenyl group, $R_2$ represents an alkyl group and X represents a member selected from the group consisting of hydrogen, a hydroxyl group, an oxygen alkyl keto group, an acid ester of phosphorus group, an alkoxy group and an —O—$SO_3$M group wherein M represents an alkali metal, —$NH_4$ or —$NH_2$.

12. A cellulose acetate colored with an azo dye selected from the group consisting of nuclear non-sulfonated monoazo dye compounds having the general formulae:

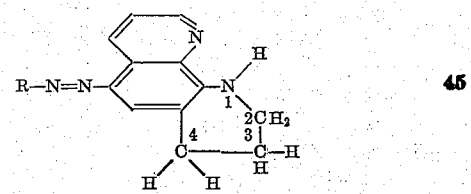

and

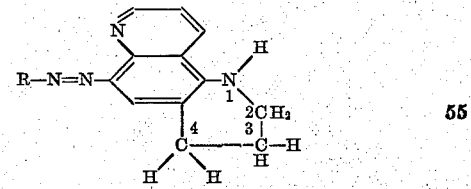

wherein R represents the residue of an aromatic nucleus, wherein the hydrogen atom attached to the nitrogen atom in the position numbered 1 may be substituted by an alkyl group and wherein one of the hydrogens in each of the positions numbered 3 and 4 may be replaced by an alkyl group.

JAMES G. McNALLY.
JOSEPH B. DICKEY.